United States Patent [19]

Adams et al.

[11] 4,372,680

[45] Feb. 8, 1983

[54] MINIATURE SPECTRALLY SELECTIVE DOSIMETER

[75] Inventors: Richard R. Adams, Newport News; Ian O. MacConochie, Yorktown; Bordie D. Poole, Jr., Seaford, all of Va.

[73] Assignee: The United States of America as represented by the Administrator of the National Aeronautics and Space Administration, Washington, D.C.

[21] Appl. No.: 195,223

[22] Filed: Oct. 8, 1980

[51] Int. Cl.³ .............................................. G01V 1/48
[52] U.S. Cl. ..................................... 356/51; 250/338; 250/372; 250/474.1
[58] Field of Search ..................... 356/51, 215; 250/338–340, 372, 473–474, 474.1; 128/664

[56] References Cited

U.S. PATENT DOCUMENTS

| | | | |
|---|---|---|---|
| 2,114,163 | 4/1938 | Bird | 356/51 |
| 3,031,576 | 4/1962 | Loy | 250/339 |
| 3,198,945 | 8/1965 | Dewes et al. | 250/474 |
| 3,851,970 | 12/1974 | Adler et al. | 356/51 |
| 3,926,522 | 12/1975 | Andreotti | 356/51 |
| 3,962,578 | 6/1976 | Roschen | 250/339 |

FOREIGN PATENT DOCUMENTS

| | | | |
|---|---|---|---|
| 55-24665 | 2/1980 | Japan | 250/372 |
| 55-26470 | 2/1980 | Japan | 250/372 |

*Primary Examiner*—William H. Punter
*Attorney, Agent, or Firm*—William King; John Manning; Howard Osborn

[57] ABSTRACT

The present invention discloses a miniature spectrally selective dosimeter capable of measuring selected bandwidths of radiation exposure on small mobile areas. This is achieved by the combination of photovoltaic detectors, electrochemical integrators (E-cells) and filters in a small compact case which can be easily attached in close proximity to and substantially parallel to the surface being measured. In one embodiment two photovoltaic detectors 13 and 8, two E-cells 15 and 9 and three filters 14 and 16 are packaged in a small case 17 with attaching means consisting of a safety pin 19. In another embodiment, two detectors 31 and 32, one E-cell 33 and three filters 34 and 35 are packaged in a small case 36 with attaching means consisting of a clip 37 to clip over a side piece 38 of an eye glass frame 39. In a further embodiment, the electro-optic elements are packaged in a wristwatch case 51 with attaching means being a watchband 52. The filters in all embodiments allow only selected wavelengths of radiation to be detected by the photovoltaic detectors and then integrated by the E-cells.

8 Claims, 6 Drawing Figures

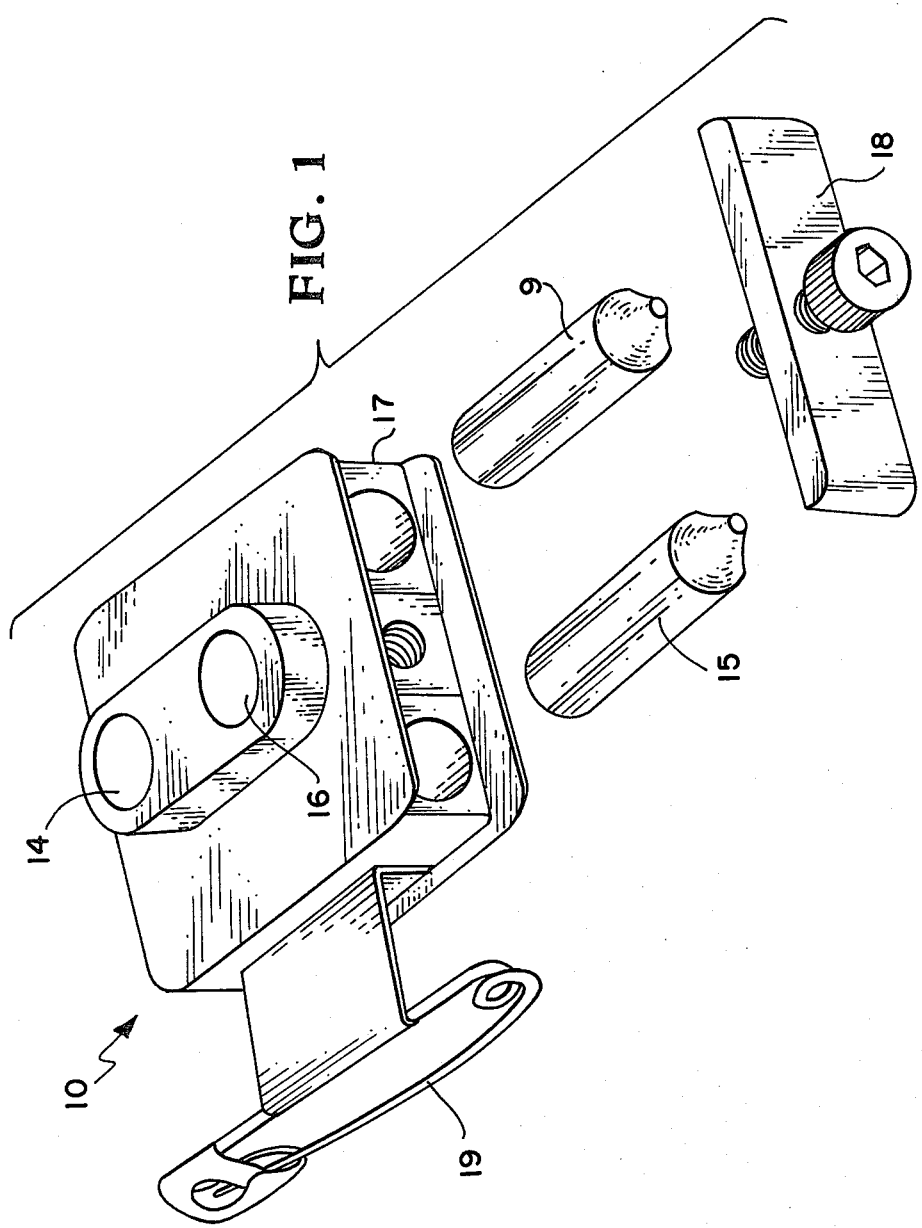

MINIATURE SPECTRALLY SELECTIVE DOSIMETER

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates generally to solar radiation and more particularly to radiation measuring devices.

In the area of clinical research a need has arisen for a device that will measure the amount of radiation received by an individual. Solar dosimeters which measure solar radiation on a horizontal surface serve only as indicators of the amount of solar radiation available at a given site. The actual exposure received by an individual will vary with circumstance, individual preference and lifestyle. In order to measure this actual exposure, a dosimeter needs to be small enough and durable enough to be worn unobtrusively on the individual's person.

Prior solar dosimeters have not been successfully applied to measure this actual exposure, primarily due to the size and complexity of the electronics required to integrate the output of the solar cells used, with sufficient sensitivity and linearity. These dosimeters require resistors or battery-powered supplies to provide the necessary sensitivity and linearity.

Researchers need a dosimeter that not only measures actual exposure, but also measures the actual exposure in selected wavelength bands, particularly the ultraviolet band. Prior dosimeters, besides being too large or fragile to measure the actual exposure, would require the use of bulky and unstable interference filters to measure the exposure in selected bandwidths.

Researchers also need a dosimeter that will measure the amount of actual exposure on a selected small area of the human body such as the forehead, nose or forearm. Prior dosimeters could not measure this exposure, since their sensors could not remain over a period of time in close proximity and substantially parallel to the selected area.

Accordingly, an object of the present invention is to provide a dosimeter that will determine the amount of actual radiation exposure received by an individual.

Another object of the present invention is to provide a dosimeter that will measure only selected bands of radiation.

A further object of the present invention is to provide a dosimeter that is small, light, durable, and low in unit cost.

Still another object of the present invention is to provide a dosimeter that will measure the amount of actual exposure on a selected small area of the human body.

Other objects and advantages of this invention will become readily apparent hereinafter in the specification and drawings.

SUMMARY OF THE INVENTION

The foregoing and other objects are attainable according to the present invention by providing a miniature dosimeter which is capable of measuring selected bands of radiation and also capable of being easily attached in close proximity and substantially parallel to the area being measured.

The invention consists primarily of one or more photovoltaic (PV) detectors, one or more electrochemical integrators (E-cells) and several filters in a compact case. The filters allow selected radiation bands to pass through to the PV detectors, the output of which is integrated by the E-cells.

In one embodiment, the PV detectors are two in number and their corresponding filters allow only ultraviolet plus infrared (UV+IR) to pass to one detector and IR only to pass to the other detector. The output from each detector is integrated by a separate E-cell, which is easily removable for readout. The mathematical difference between the outputs is proportional to the UV band exposure.

In another embodiment the output from two PV detectors goes to one E-cell. The UV+IR detector output charges the E-cell by plating silver, while the IR detector output discharges the E-cell by deplating silver, resulting in a total accumulation which is proportional to the amount of UV band exposure alone.

The compact case in which the PV detectors, E-cells, and filters are packed is easily attachable to measure a selected area. In one embodiment, the attaching means is basically a safety pin; in another embodiment, the means is a clip to clip over an eyeglass frame; and in still another embodiment, the means is a wristwatch band.

The invention also includes a readout device consisting primarily of a constant voltage source, transistor, and light emitting diode (LED) used in conjunction with a stopwatch. An E-cell which has been removed from the dosimeter is inserted into the readout device. The constant voltage source is used to deplate at a constant rate the silver accumulated. The transistor and LED indicate when all the silver has been deplated. The time taken to deplate is read by the stopwatch and is proportional to the amount of radiation exposure detected by the detector and integrated by the E-cell.

BRIEF DESCRIPTION OF THE DRAWINGS

FIG. 1 is an exploded view of one embodiment of the invention;

DETAILED DESCRIPTION OF THE INVENTION

Figure 2:
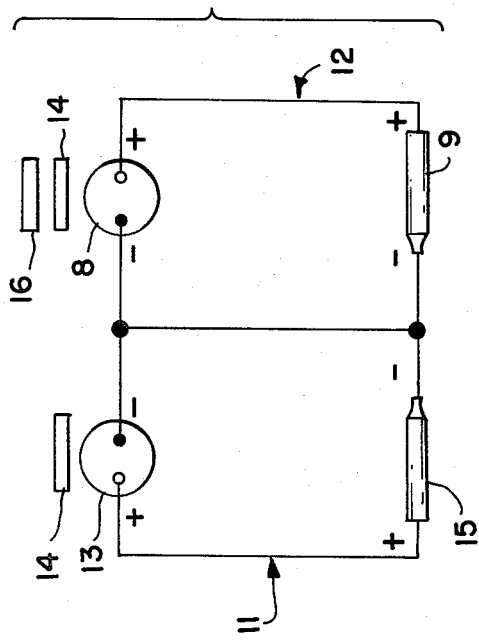
FIG. 2 is a schematic of the embodiment pictured in FIG. 1.

Turning now to the embodiment of the invention illustrated in FIGS. 1 and 2, the dosimeter 10 consists of two channels 11 and 12. Channel 11 consists basically of a ultraviolet (UV) enhanced PV detector 13, a black glass filter 14, and an E-cell 15, while channel 12 has a matched PV detector 8, an E-cell 9, a black glass filter 14 and also a sharp cut yellow glass filter 16. These components are packaged in a compact case 17 with a side 18 to allow for easy removal of the E-cells. The case 17 has attaching means of a safety pin type 19.

The attaching means 19 allows the dosimeter 10 to be placed in close proximity to the surface being measured for radiation exposure and in conjunction with the case 17 allows the detectors 13 and 8 to be positioned substantially parallel to the surface being measured. Thus, the actual exposure on that surface can be measured.

In operation, when daylight strikes the filters, the filter 14 in channel 11 allows UV+IR radiation to reach the detector 13 which then allows a proportional amount of silver to be plated in E-cell 15. At the same time, the filters 14 and 16 in channel 12 allow only the IR radiation to reach the detector 8, thus silver proportional to the amount of IR radiation only is plated in E-cell 9. The E-cells 9 and 15 can be easily removed from the case 17 by removing side 18.

Figure 4:
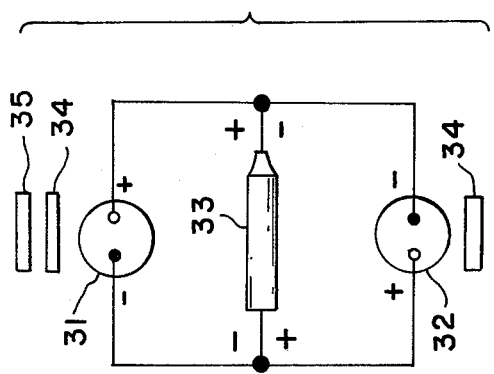
FIG. 4 is a schematic of the embodiment pictured in FIG. 3.
Figure 3:
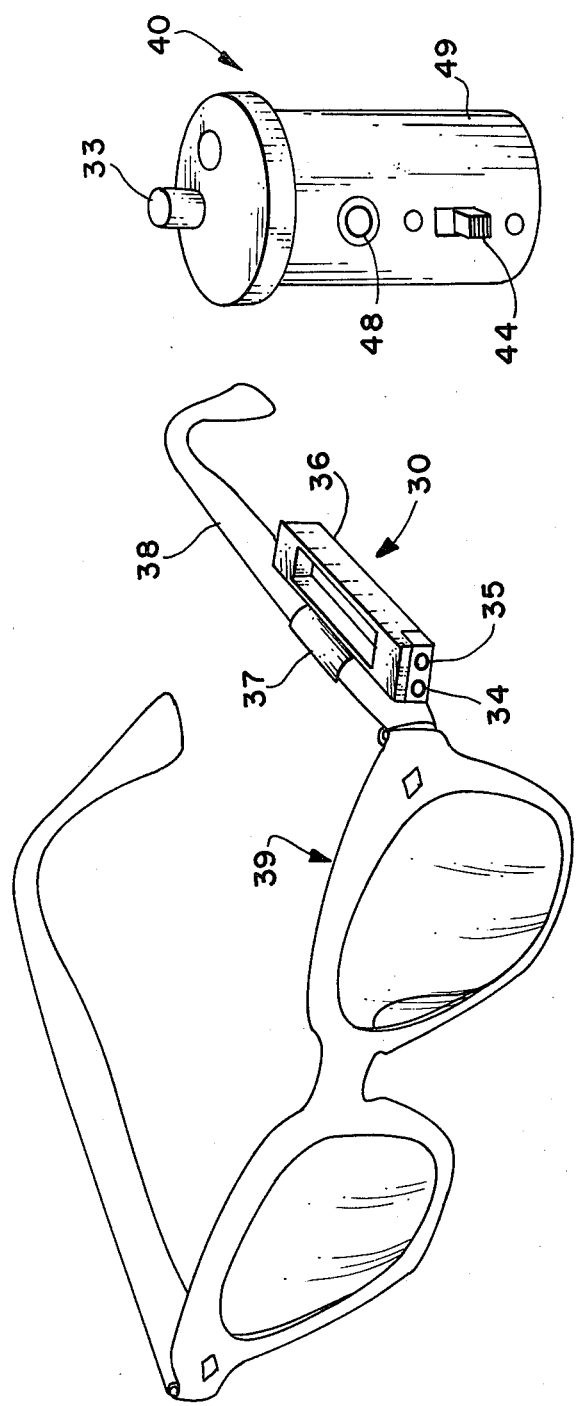
FIG. 3 is a pictorial view of an alternate embodiment of the invention and of the readout device.

Turning to the embodiment of the invention illustrated in FIGS. 3 and 4, the dosimeter 30 consists of basically the same components as the prior embodiment, two UV enhanced PV detectors 31 and 32, two black glass filters 34, one yellow glass filter 35, and one E-cell 33. These components are packaged in a compact case 36 which has an attaching means consisting of a clip 37 for attaching to the sidepiece 38 of the eyeglass frame 39.

In operation, this embodiment works similarly to the first embodiment; however, the output from the PV detectors 31 and 32 go into one E-cell 33 rather than two. The output from detector 32, which is proportional to the amount of UV+IR radiation exposure, is connected with E-cell 33 so as to charge the E-cell 33 by plating silver; while the output from detector 31, which is proportional to the amount of IR radiation exposure, is connected to and discharges the E-cell 33 by simultaneously deplating silver. The overall result is that the amount of silver plated in the E-cell 33 is proportional to the amount of UV radiation exposure only.

Figure 5:
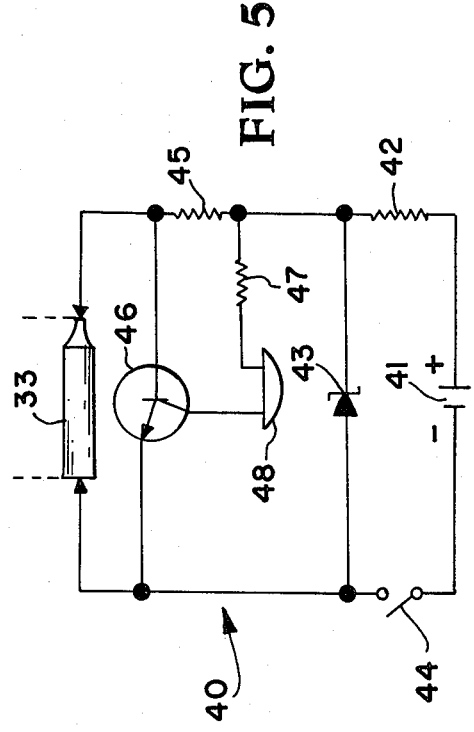
FIG. 5 is a schematic of the readout device picture in FIG. 3.

The information stored in the E-cell 33 can be determined by a commercially available readout system or by the use of the compact, portable readout device illustrated in FIGS. 3 and 5.

Turning now to the illustrated readout device, the device 40 consists primarily of a constant voltage source formed of a battery 41, 1 K resistor 42, and 10 volt Zener diode 43; a switch 44; a 10 K resistor 45, which sets the read current to a constant one milliampere value; a transistor 46; a resistor 47; and a light emitting diode (LED) 48. These components are packaged into a small compact film can 49.

In operation, the readout device is used in conjunction with a stopwatch. The E-cell 33 is inserted into the readout device circuitry. When the switch 44 is closed, the stopwatch is started. The closing of the switch 44 allows the current which is set at the constant value of one milliampere, to pass through the E-cell 33 deplating the accumulated silver. When all the silver in the E-cell 33 has been deplated, the resistance in the E-cell 33 abruptly increases causing the transistor 44 to conduct which leads to the LED 48 lighting. When the LED 48 lights, the stopwatch is stopped and the switch 44 is then opened. The product of the current used and the time required to deplate is proportional to the amount of radiation exposure integrated by E-cell 33. This reading out process of the E-cell 33 also resets the E-cell 33 for subsequent reuse.

Figure 6:
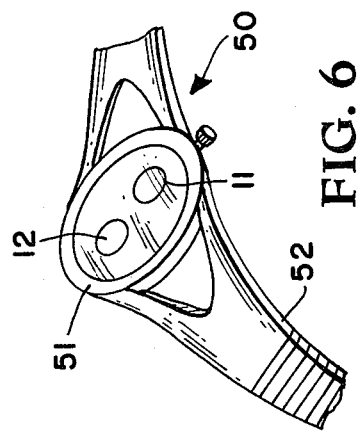
FIG. 6 is a pictorial view of another alternate embodiment of the invention.

Turning to the embodiment illustrated in FIG. 6, the dosimeter 50 has the same internal electro-optic circuitry as illustrated in FIG. 2 which consists of two channels 11 and 12. The components, however, are packaged in a wristwatch case 51 with a wristwatch band 52 as attaching means for positioning the dosimeter in close proximity and substantially parallel to the forearm which is the surface being measured for radiation exposure.

The advantage of this invention are numerous and it is particularly adapted for use in clinical research on the effects of UV radiation exposure on the human body because of its small size, light weight and durability. The invention can also be used in marine biology, horticulture or agronomy studies where the relationship between radiation exposure and life growth are required, since the invention can be mounted on a stem or other convenient structure and oriented with the sensors in the desired direction.

Another advantage of this mechanism is that any desired radiation band within the range of the detectors can be isolated and measured.

Still another advantage is the ease in obtaining the collected data without added exposure or added size and complexity to the dosimeter.

It is to be understood that the forms of the invention herewith shown and described are to be taken as illustrative embodiments. Various changes may be made without departing from the spirit or scope of the invention as defined in the following claims.

What is claimed as new and desired to be secured by Letters Patent of the United States is:

1. A spectrally selected radiation measuring device for measuring the amount of radiation on a mobile surface comprising:
   detector means for detecting radiation;
   filter means located between the radiation measuring source and said detector means for allowing only selected wavelength bands to be detected by said detector means;
   electrochemical integrator means for integrating the output of said detector means;
   means for packaging said detector means, integrating means, and filter means compactly;
   means for attaching packaged means so that said detector means remains at all times in close proximity and substantially parallel to the mobile surface being measured;
   readout means for reading out electrochemical integrator data and wherein said readout means comprises means for constantly discharging said electrochemical integrator; and
   means for indicating when said electrochemical integrator is completely discharged, whereby the time taken to discharge the electrochemical integrator is indicative of the amount of radiation integrated.

2. A spectrally selected radiation measuring device for measuring the amount of radiation on a mobile surface comprising:
   first and second photovoltaic detector means that are ultraviolet enhanced for detecting radiation;
   a first filter means located between the radiation source and said first detector means for allowing only ultraviolet and infrared wavelength bands to be detected by said first detector means;
   a second filter means located between the radiation source and said second detector means for allowing only the infrared wavelength band to be detected by said second detector means;
   an electrochemical integrator connected to the outputs of said first and second detector means such that the output of said first detector means charges said integrator and the output of said second detector means discharges said integrator;

means for packaging said first and second detector means, integrator, and first and second filter means compactly; and means for attaching the packaging means so that said first and second detector means remains at all times in close proximity and substantially parallel to the mobile surface being measured.

3. A dosimeter for measuring ultraviolet solar radiation comprising:

first and second detector means for detecting radiation;

a first filter means located between the radiation source and said first detector means for allowing only ultraviolet and infrared wavelength bands to be detected by said first detector means;

a second filter means located between the radiation source and said second detector means for allowing only the infrared wavelength band to be detected by second detector means;

electrochemical integrator means connected to the outputs of said first and second detector means for integrating the outputs of said first and second detector means by plating the electrochemical integrator means; and means for measuring the charge on said electrochemical integrator means due to the difference in the output of said first detector means and the output of said second detector means by deplating the electrochemical integrator means whereby the measurement is the ultraviolet radiation from the radiation source.

4. A dosimeter according to claim 3 wherein said electrochemical integrator means is E-cell means.

5. A dosimeter according to claim 3 wherein said electrochemical integrator means comprises a first electrochemical integrator connected to be charged by the output of said first detector means and a second electrochemical integrator connected to be charged by the output of said second detector means.

6. A dosimeter according to claim 5 wherein said first and second electrochemical integrators are first and second E-cells.

7. A dosimeter according to claim 3 wherein said electrochemical integrator means comprises an electrochemical integrator connected to be charged by the output of said first detector means and to be discharged by the output of said second detector means by deplating the electrochemical integrator.

8. A dosimeter according to claim 7 wherein said electrochemical integrator is an E-cell.

* * * * *